UNITED STATES PATENT OFFICE.

STANISLAS SOREL, OF PARIS, FRANCE, ASSIGNOR TO JOHN F. WOOD, OF BOSTON, MASSACHUSETTS.

IMPROVEMENT IN THE MANUFACTURE OF CEMENT FOR ARTIFICIAL STONE.

Specification forming part of Letters Patent No. 100,944, dated March 15, 1870.

SPECIFICATION.

Be it known that I, STANISLAS SOREL, of Paris, in the Empire of France, have invented a new and useful composition of matter, being an Improvement in the Manufacture of Cement for Artificial Stone and other purposes.

I am the same person to whom Letters Patent of the United States, dated March 6, 1866, and numbered 53,092, were granted for an improved composition to be used as a cement, &c.

The basis of my present claim is the use of the natural rock known as magnesite, more or less impure, from which to procure the oxide of magnesium, deemed now, as heretofore, an essential element of my cement when treated and combined in the manner hereafter described.

In the specification annexed to my said Letters Patent I speak of magnesia, which is oxide of magnesium, as an essential element of my cement. By magnesia is usually understood the magnesia of commerce, a manufactured article of considerable cost and of limited demand and supply.

I am aware that magnesium exists in other natural forms than magnesite, as in magnesian limestone or dolomite, in talc, and in steatite or soapstone, meerschaum, and serpentine; but from neither of these can our magnesian base be so cheaply and abundantly derived by any known process as by my process from magnesite.

Large deposits of magnesia have been recently discovered in the United States, both east and west, and it can be used in many places with economy for my purposes.

I hereby declare that the following is a full, clear, and exact description of the process of manufacturing my cement by the use of magnesite according to my invention.

I throw the magnesite, as found in nature, into a furnace and subject it to a red heat from one to fifty hours. I prefer, for general use, about twenty-four hours. I then pulverize what remains, and then thoroughly mix it with any mineral substance, as sand, gravel, the dust and fragments of marble and other stones, or with emery or other grits, or with cotton, wool, or other fibrous material, according to the result desired. The proportion of such substances varies with the work to be done from one-half to twenty or more to one. This mixture is then moistened with chloride of magnesium or with bittern-water, as being in many localities the cheapest and most convenient liquid, or with solutions equivalent in effect. It is wet sufficiently in some cases to form a mortar, and in some cases only to produce a state of dampness like that of molding-sand prepared for use, and is then compressed by ramming, beating, pressing, or other convenient means, or rolled or spread in slabs or sheets or other forms desired, when it soon sets and forms a very hard, strong, and durable stone or other product, partaking of the color and qualities of the substances combined.

The cement thus made may be used for all the purposes set forth in my original patent before referred to; this invention being an improvement in the manufacture of the cement therein described.

What I claim as my invention, and desire to secure by Letters Patent, is—

1. I claim the manufacture of cement by the use of magnesite, substantially as described.

2. I claim the process of procuring the oxide of magnesium from magnesite, for the purpose of manufacturing cement, substantially as described.

SOREL, S.

Witnesses:
  J. U. ZUST,
  F. OLCOTT.